Oct. 4, 1966　　　H. A. BARNBY　　　3,276,884
LIQUID BABY FOOD PACKAGE AND NURSER ASSEMBLY
Filed June 12, 1963
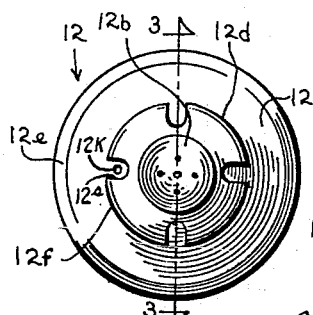
FIG. 2
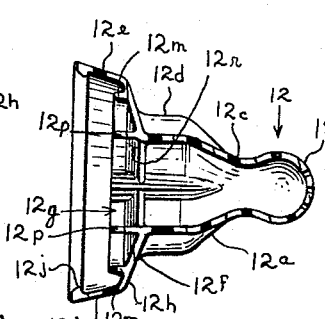
FIG. 3
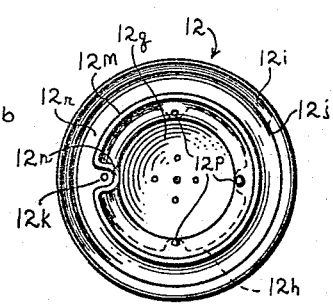
FIG. 4
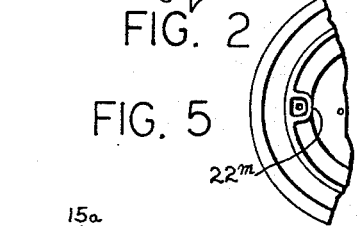
FIG. 5
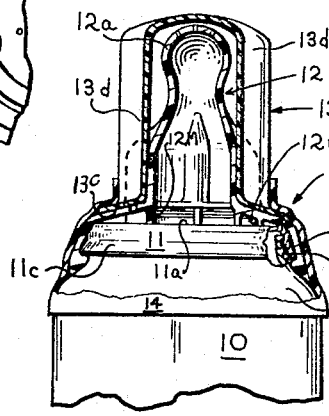
FIG. 1
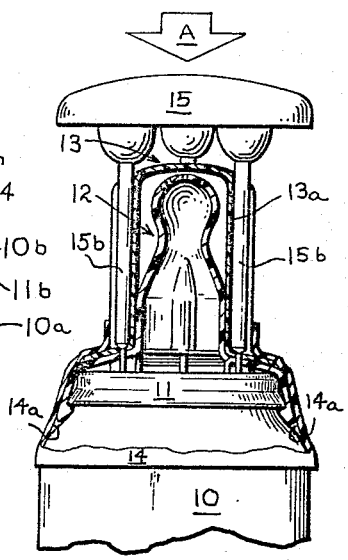
FIG. 8
FIG. 7
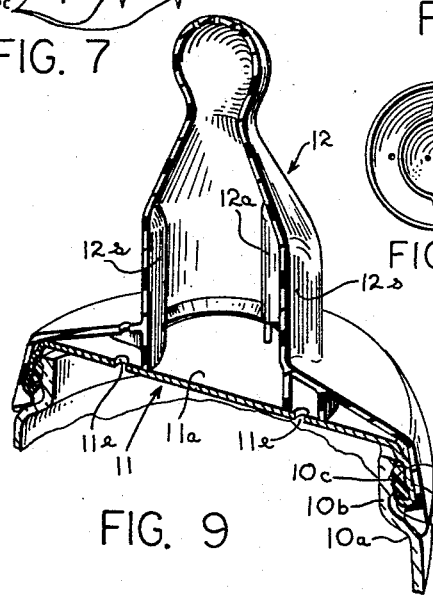
FIG. 9
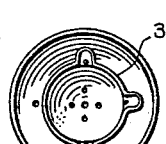
FIG 6
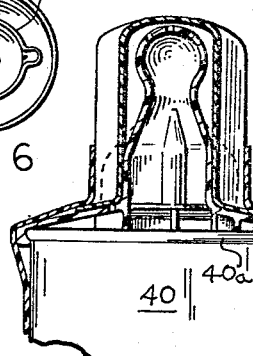
FIG. 10
INVENTOR.
HERBERT A. BARNBY
BY Claron N. White
and W. A. Schaich
ATTORNEYS

United States Patent Office 3,276,884
Patented Oct. 4, 1966

3,276,884
LIQUID BABY FOOD PACKAGE AND NURSER ASSEMBLY
Herbert A. Barnby, Toledo, Ohio, assignor to Owens-Illinois, Inc., a corporation of Ohio
Filed June 12, 1963, Ser. No. 287,385
16 Claims. (Cl. 99—171)

Generalizing, the present invention relates to a liquid baby food package and nurser assembly.

According to one particular aspect, the present invention also relates to an aseptic liquid baby food package, or nurser package, wherein such liquid baby food items as milk, milk formula, fruit juice, or other beverages and liquid forms of nourishment suitable for baby feeding may be commercially prepared and packaged under sterile, sanitary and closely controlled scientific processing and packaging conditions, and wherein the package is so constructed that such liquid baby food items may be fed directly from the package to a baby without an attendant danger of disturbing the sterility or aseptic condition of the package and its contents.

According to another particular aspect, the present invention relates to a novel nurser assembly, as well as the constituent components thereof, which is constructed in such fashion that it may be readily employed and utilized in conjunction with conventional-types of liquid baby food containers, such as bottles and cans, to effectuate the fabrication of an aseptic liquid baby food package of the character described above.

Such baby food preparations as milk, milk formula, fruit juice, as well as other forms of liquid nourishment, are customarily available for retail purchase in hermetically sealed containers. However, such commercially available preparations must ordinarily be removed from the container in which they are purchased and thereafter placed in a nursing bottle to enable consumption thereof by a baby. Ancillary to such transfer, and according to customary household baby feeding procedures, it is necessary to sterilize all nursing bottles, nipples and caps which may be used in conjunction with the nurser feeding of such baby food preparations. Furthermore, sterilization is required for such other apparatus or utensils as may be utilized in measuring, preparing and transferring the purchased baby food product to a nursing bottle. As a consequence, there is always an attendant danger of contaminating the baby food preparation while it is being removed from the container in which purchased and while being measured, prepared and transferred to a nursing bottle. For example, exposure of the liquid baby food to sundry types of prevalent unsanitary conditions is not uncommon even when extreme caution is employed during the course of such household preparation. As an example, improper sanitization or sterilization of those items coming into contact either with the liquid baby food preparation or the baby's mouth afford a dangerous source of germinal or bacterial contamination.

By way of comparison with conventional household procedures of sterilization and precautionary measures for the exclusion of pathogenic microorganisms and other forms of bacterial or germinal contamination, modern-day commercial baby food processing and packaging techniques are far superior. Commercial processing and packaging entails the utilization of highly skilled technicians and scientific apparatus to insure that the quality, purity, nutritional value and flavor, together with the most wholesome overall conditions possible, attend the processing and packaging of such baby food preparations. These commercial techniques, to insure the preservation of such purity and wholesome qualities, include packaging liquid baby food preparations in hermetically sealed glass or metal containers, such as conventional wide-mouth or semi-wide-mouth glass containers or metal cans.

Accordingly, the present invention is contrived to obviate the time consuming tasks incident to household cleansing and sterilizing of nursing bottles, nipples, caps and other utensils and which are ordinarily necessary prior to consumption of commercially prepared liquid baby food preparations or nourishment. Additionally, the invention herein is devised to effectively preclude the normally inherent danger of unsanitary or unwholesome conditions attending customary home preparation and feeding of liquid-types of baby food preparations. Furthermore, the avoidance of such disagreeable and time-consuming tasks and frequently unsanitary conditions constitute principal objectives of the present invention.

Another principal objective of this invention is the provision of a unitary aseptically packaged liquid-form of baby food, or nourishment, which may be consumed by a baby directly from the package without necessitating transference of the packaged contents to a nursing bottle or other nursing container prior to the baby's consumption of the contents.

Another object is to provide a nurser assembly for nipple-feeding a baby and which may be utilized as an aseptic nursing assembly with conventional containers in which are contained commerically prepared and packaged liquid baby foods, such as milk formula, and other forms of liquid baby nourishment.

Another object hereof is to provide a unitary package for commercial use in packaging liquid baby food preparations in hermetically sealed containers and which is characterized by the inclusion of a nursing assembly forming an integral part of such package and which functions to dispense such baby foods, upon opening the container, through a component nursing nipple without necessitating assembling or repositioning of the nursing nipple preparatory to commencing feeding of such preparations to a baby directly from the container.

Another objective is to provide a nursing package capable of being assembled in cooperative relationship to form a nursing package comprising; a hermetically sealed container having a perforable dispensing end, a hollow nursing nipple carried on the container with a flanged base arranged to cooperate with the container's dispensing end to form therewith an enclosed passageway emptying into the nursing nipple.

Another object of this invention is, in furtherance of the last-mentioned objective, to provide means for disrupting the hermetically sealed condition of the container without disturbing the cooperative relationship existing between the container and nursing nipple and while the nursing nipple remains aseptically confined within a detachable enclosure.

An additional objective hereof is to provide components which may be assembled to form a unitary package in accordance with the foregoing objectives.

The specific nature of the present invention, as well as other objects and advantages thereof, will become apparent to those skilled in the art from the following detailed description taken in conjunction with the annexed drawings wherein, by way of example only, certain preferred embodiments of this invention are illustrated, and wherein:

FIG. 1 is a partially fragmentary, elevational view of an assembled baby food package and nurser assembly embodying the present invention, and depicting certain of the assembled components in centrally sectioned aspect to illustrate the cooperative relationship thereof;

FIG. 2 is a plan view of the nursing element illustrated in the embodiment shown in FIG. 1;

FIG. 3 is a sectional view of the nursing element taken along the line of the plane 3—3 in FIG. 2;

FIG. 4 is a bottom view of the nursing element illustrated in FIG. 1;

FIG. 5 is a fragmentary view similar to FIG. 4, but illustrating a modification on the underside surface of the nursing element;

FIG. 6 is also a view similar to FIG. 4, but showing a further modification of the underside surface of the nursing element;

FIG. 7 is an elevational view of a piercing or puncturing tool for use with the present invention as a means to permit the nurser package to be utilized for nursing purposes;

FIG. 8 is a view similar to FIG. 1, but illustrating the cooperative functional relationship between the piercing or puncturing tool shown in FIG. 7 and the embodiment illustrated in FIG. 1;

FIG. 9 is a partially fragmentary perspective view in centrally-sectioned elevational aspect and illustrating the baby food package and nurser assembly subsequent to the piercing or perforating operation depicted in FIG. 8, and with some of the components removed for baby feeding purposes;

FIG. 10 is a view similar to FIG. 1, but illustrating the invention embodied with a different form of container.

Alluding briefly to FIG. 1, the present invention is illustrated, in one preferred aspect, embodied in an aseptic nurser package composed of a combination liquid baby food package and nurser assembly. Included in the nurser package is a conventional wide-mouth or semiwide mouth glass container 10 in which there is hermetically packaged a commercially prepared form of liquid baby food, not shown, such as milk formula, fruit juice, or other like form of liquid nourishment suitable for ingestion by a baby or infant through a nursing nipple. The container's contents, of course, are prepared and packaged in accordance with the high standards of quality, purity and sterility common to scientifically controlled commercial processing and packaging techniques which insure that such liquid baby food preparations are maintained in a wholesome, sterile and flavorsome condition after packaging by means of a closure 11 which fits over the filling and dispensing end 10a of the container 10 and hermetically seals the packaged contents within the container. Mounted on the closure 11, and extending axially outward therefrom, there is a nursing element 12 of hollow formation and which includes a nursing nipple 12a provided with a perforate nursing end through which the container's contents may ultimately be fed to a baby. The nursing nipple at the time of assembly into the nursing package is in a sterile condition and is maintained in an aseptic condition within a protective thimble-shaped shield or lid 13 which fits over and around the nursing nipple 12a and isolates the nursing nipple from germinal and bacterial contamination after packaging. Assurance against removal of the lid 13, or such tampering as may permit contamination of the nursing nipple 12a, may be provided by a destructible seal which when broken will visibly disclose such removal or tampering. Such a seal may be afforded by a tight-fitting continuous peripheral band, or tape 14, which surrounds the base of the lid 13, nursing nipple 12a and closure 11 and fastens the same to the exterior wall of the container 10. The tape 14 is of such nature that it must be broken in order to remove the lid 13, and when so broken is irreplaceable except by special packaging equipment ordinarily available only to the commercial packager.

Preparatory to feeding the liquid contents of the container 10 to a baby, or small infant, one, and preferably two or more, holes are pierced or punctured through the closure 11, by means of a suitable sharp-pointed object, such as an ice pick or the like. A preferable form of piercing or puncturing tool 15, particularly suitable and designed for this purpose, is illustrated in FIG. 7 and functions, as illustrated in FIG. 8, in such manner as to permit puncturing of the closure 11 prior to disassembly of the package or disruption of the aseptically packaged condition thereof. Thus, only when it is desired to actually commence the feeding of the baby does it become necessary to remove the protective lid 13, as shown in FIG. 9. Consequently, feeding may be quickly initiated without necessitating any manual, or other handling, or contact with the nursing nipple prior to the feeding. Additionally, only momentary atmospheric exposure of the nursing nipple is required preceding insertion of the nursing nipple into a baby's mouth. As a result the danger of contamination of the nursing nipple or exposure thereof to unsanitary conditions is effectively precluded.

More specifically, and as illustrated in FIG. 1, the glass container 10 is shown as a conventional widemouth container having a relatively large filling and dispensing opening defined in the dispensing end 10a thereof. Although various types of conventional glass containers of the widemouth or semiwide-mouth variety might be employed for the purpose of this invention, such as, for example, commonplace home canning jars having threaded necks accommodating screw-type lids, a preferred type of container is depicted herein having an axially tapered side-sealing rim 10b located on the exterior surface of the dispensing end 10a and which accommodates a snap-on or press-on type of lid or closure, such as the closure 11.

The closure 11, which fastens over the dispensing end 10a of the container 10, is likewise preferably of the side-sealing type and when snapped or pressed onto the container forms a hermetic seal for the protection of the purity, flavor and wholesome qualities of the container's contents. The closure 11 is preferably fabricated from metal or a soft plastic material, which, in addition to being sufficiently strong to withstand the elevated temperatures and sterilizing conditions encountered in processing and packaging of the container and its contents, has a circular top surface portion 11a which is capable of being easily punctured with a manually manipulated, sharp-pointed piercing tool. The hermetic sealed attachment of the closure 11 to the container dispensing end 10a is effected through the use of an annular gasket 11b which is held in assembled position (as best shown in FIG. 9) on the interior peripheral surface of the closure skirt portion 11c by crimping the skirt portion 11c around a lower marginal edge of the gasket, as at 11d. When the closure is properly assembled on the container's dispensing end 10a the annular gasket 11b snaps over and hermetically seals against the exterior surface of the tapered rim 10b, as at 10c. A snap-on or press-on side-sealing closure and container combination of the foregoing type is more particularly described in U.S. Patent No. 2,731,165, issued January 17, 1956, to John Hohl, and assigned to the assignee of the present invention.

More specifically, and as best illustrated in FIGS. 2 and 3, the hollow nursing element 12 is of generally cylindrical, tubular construction and is preferably fabricated from a resilient and flexible rubber or rubber-like plastic material possessing extremely good resilient fight-back properties, such that the material even after being pierced or punctured with a sharp-pointed object, such as the puncturing tool 15, will recoil upon withdrawal of the puncturing object and tightly close the resultant perforation or puncture sufficiently to prevent the passage of air or liquid through the perforation under mild conditions of pressure differential.

The axially extending nursing nipple 12a is formed with a bulbous, perforate outer end portion 12b which is of a size suitable for insertion into a baby's mouth during feeding. Axially inwardly from the outer end portion 12b the nursing nipple converges inwardly to form a reduced diameter neck portion 12c from which the nursing nipple diverges outwardly and merges into an enlarged body portion 12d. The mounting of the nursing element 12 on the closure 11 is effected by an annular, radially flanged inner end portion 12e, or base, which is preferably fabricated as an integral and confluent part of the nursing nipple 12a and merges therewith along a circular line or area of confluence, as at 12f.

The flanged inner end portion 12e of the nursing element 12 defines an orifice at 12g, opening axially into the interior region of the nursing nipple 12a to accomodate passage of liquid baby food or nourishment from the flanged inner end portion 12e to the perforate outer end portion 12b. The construction of the flanged inner end portion 12e is such that an enlarged substantially circular shoulder 12h emanates radially outward from the circular area of confluence, at 12f, between the flanged inner end portion 12e and the nursing nipple 12a and bends downwardly to form a resiliently distensible, depending, peripheral skirt 12i terminating in an inwardly projecting bead 12j which is shaped to snap under the annular rim 11c of the closure 11 in snap-fit relationship. Spaced radially outward from the circular area of confluence, at 12f, the shoulder 12h defines a transverse aperture 12k, best shown in FIGS. 2 and 4, which provides a vent opening through the inner end portion 12e through which air may pass into the punctured container 10 during feeding.

On the underside surface 12r of the inner end portion 12e, there is formed an integral and resilient, closed annular rib 12m, as shown in FIG. 4, which is for the most part descriptive of a circular configuration and extends in continuous or endless manner circumambiently around the orifice at 12g. As depicted in FIG. 1, the rib 12m is arranged to seat upon the top surface portion 11a of the closure 11. When so seated the rib 12m cooperates to urge the underside surface 12r of the shoulder 12h apart from the top surface portion 11a of the closure 11 and bias the inwardly projecting bead 12j snugly under the annular rim 11c of the closure 11. In commensurate fashion the closure contacting edge surface of the rib 12m is urged tightly against the top surface portion 11a of the closure 11 to form a fluid and air-tight seal therebetween. It will be observed, particularly in FIG. 4, that although the rib 12m is, as mentioned, for the most part generally circular, it is significant that, except at the location of the transverse aperture 12k, the rib is spaced radially outward from the central axis of the nursing element 12 a greater distance than is the vent opening provided by the transverse aperture 12k. In other words, at the location of the transverse aperture 12k, the rib 12m defines a concave sinus, as at 12n, and permits the rib to pass radially inward of the transverse aperture 12k and radially outward of the orifice, at 12g, to prevent passage of air or fluid directly between the transverse aperture and orifice.

The particular construction of the endless closed rib 12m is subject to considerable modification within the intended scope of the invention. For example, as shown in FIG. 5, the closed endless rib may be formed in the manner of rib 22m wherein a portion of the closed rib completely encircles and surrounds the transverse aperture or vent opening which corresponds to the transverse aperture 12k previously described. Also, the remainder of the rib 22m may be substantially identical to the structure depicted in FIG. 4. Similarly, another rib modification is shown in FIG. 6, wherein the rib is designated as 32m and describes a sinuous and endless path extending circumambiently around the orifice and wherein a major portion of the rib is located closer to the central axis of the nursing element than the remaining portions thereof which form a convex sinus located at one or more marginally spaced locations around the area of confluence of the nursing nipple and flanged inner end portion.

A common feature however of all of the closed rib structures described is that the rib passes radially inwardly of the transverse aperture, or a vent opening, and radially outward of other equally radially spaced locations around the shoulder 12h of the nursing element 12.

The underside surface 12r of the flanged inner end portion 12e is also preferably formed with one or more marginally spaced, depending lugs 12p (three such lugs being depicted in FIG. 4) which are arranged to bear against the top surface portion 11a of the closure 11 adjacent to the edge of the orifice 12g to provide additional bracing to the underside surface of the flanged inner end portion 12e and to maintain the spaced overlying relationship thereof with respect to the top surface portion 11a of the closure 11, particularly during the closure piercing or puncturing operation which will be subsequently described.

To facilitate proper alignment of the puncturing tool 15 with the transverse aperture 12k and preselected locations where it is desired to puncture the top surface portion 11a of the closure 11, the body portion 12d of the nursing element 12, is, as best illustrated in FIG. 9, preferably provided with marginally spaced longitudinal grooves or indentations, as at 12s, in which to register the puncturing tool 15 when it is desired to remove the container's contents for feeding purposes.

The thimble-shaped shield, or lid 13, which fits over and encloses the nursing nipple 12a may be fabricated from metal, glass, plastic or other air and moisture impervious substance. For purposes of appearance and economy however, the lid is preferably formed from a plastic material having properties of imperviousness essential to maintaining the nursing nipple 12a in its originally packaged aseptic condition without danger of contamination during the interval between packaging and ultimate consumption of the container's contents. The interior dimensions and configuration of the lid 13 are preferably, but not necessarily, such that the body portion 13a of the lid 13, when assembled, contacts and snugly conforms to the exterior surface configuration of the body portion 12d of the nursing nipple 12a. Similarly, an open ended base 13c at the lower end of the lid 13 is preferably flared outwardly to correspond to the surface configuration of the upwardly facing surface of the shoulder 12h of the nursing element 12 upon which the base 13c is supported. Where the lid is fabricated from a hard or frangible material, the base 13c is preferably formed with one or more transverse base apertures or base slots, not shown, situated in axial alignment with the longitudinal slots at 12s formed in the body portion 12d of the nursing element 12 and corresponding and conforming longitudinal slots or grooves formed in the axially extending wall portion of the lid, as at 13d, best shown in FIG. 1. Where, however, a soft material or easily puncturable material is employed such transverse base apertures or base slots may be omitted.

Protection and assurance against displacement or removal of the lid 13 from the nursing element 12 prior to purchase of the package is afforded by the annular band or tape 14 which is superimposed over and extends circumferentially around the lower body portion and base 13c of the lid 13, as well as around the peripheral skirt 12i and circular shoulder 12h of the nursing element 12 and the dispensing end 10a of the container 10. The tape 14 is preferably a transparent cellophane wrapping, as illustrated, or may be fabricated from other types of thin dust and moisture impervious plastic, paper, or similar materials and is provided with an adhesive or cohesive undersurface 14a suitable for bonding or adhering the band or tape to the assembled elements over and around which it is positioned or wrapped.

As illustrated in FIG. 8, the assembled package may be quickly and easily readied for baby feeding or nursing merely by perforating the base 13c of the lid 13, the shoulder 12h of the nursing element 12, and thence the closure 11 at a selected area or areas such as indicated at 11e best shown in FIG. 9.

The piercing or puncturing tool 15, which is particularly suitable for perforating the closure 11, nursing element 12 and shield 13 preparatory to baby feeding is best shown in FIG. 7. The invention herein, however, is not intended to be limited by the particular type of perforating means shown, since it will be clearly apparent that most any sharp-pointed implement or tool, such as a conventional ice pick, might be utilized, although not as conveniently or expeditiously as the puncturing tool illustrated. In the form illustrated the puncturing tool 15 is provided with an impact or pressure receiving end in the form of a head plate, or transverse pressure plate 15a, from which several prongs 15b (at least four such prongs being preferable) are rigidly carried in depending marginally spaced relationship and respectively provided with a sharp-pointed distal end 15c adapted to readily penetrate or puncture the top surface 11a of the closure 11 when directed thereagainst under the application of manual pressure or impact imparted downwardly to the pressure plate 15a, as best illustrated in FIG. 8 and in the manner indicated by the directional arrow A.

In operative aspect, as in FIG. 8, the prongs 15b are arranged in position to straddle the body portion 13a of lid 13 in closely adjacent relationship and are positioned to register with the longitudinal slots which in turn align one of the prongs axially to pass through the transverse aperture 12k in the shoulder of the nursing element 12. Thereafter, manual pressure or slight impact is applied downward upon the pressure plate 15a to cause one of the prongs to pass through the transverse aperture which is radially outward of the closed rib 12m, and to puncture or pierce the shoulder 12h of the nursing nipple at locations adjacent to the lugs 12p and radially inward from the closed endless rib 12m (or ribs 22m and 32m in the modifications shown in FIGS. 5 and 6) and thence to puncture and perforate the top surface 11a of the closure 11. Proper alignment of the prongs 15b is assured by virtue of the orientation provided by the transverse aperture 12k or vent opening, and the longitudinal slots 13d in the shield or lid 13 which receive the prongs 15b and guide them in such manner as to coincide with perforable areas of the flanged inner end portion 12e of the nursing element 12 disposed radially outward from the area of confluence of the nursing nipple 12a and the flanged inner end portion.

As illustrated in FIG. 9, the lid 13 and, if desired, the tape 14 may be removed from the package after perforating the closure 11, to permit the nursing nipple 12a to be received or inserted into the mouth of the baby. When the container 10 is tilted or inverted for feeding purposes, the liquid contents of the container 10 will flow outwardly through the perforations at 11e and into the space or passageway bordered and defined between the closed rib 12m, the top surface portion 11a of the closure 11, and the spaced-apart underside surface 12r of the nursing element 12, and thence empty into the nursing nipple 12a. As illustrated, the last-mentioned passageway is generally annular in shape and leads radially inward from the perforated areas 11e of the closure 11 and empties through the orifice 12g into the interior of the nursing nipple from which the baby may withdraw the contents in conventional manner through the perforate, bulbous outer end portion 12b.

As illustrated in FIG. 10, the present invention may be likewise embodied in a package utilizing a metal container, such as a conventional hermetically sealed metal can 40, in which liquid baby food or similar liquid nourishment is frequently packaged. As shown, the flanged inner end 42e of the nursing element is slightly modified to substantially eliminate the peripheral skirt at 42i, and so that the inwardly projecting bead 42j may fasten snugly under the rim 40a of the can in snap-fit relationship.

Irrespective of which of the foregoing embodiments is utilized, there is provided by the present invention, an economical and compact liquid baby food package and nurser assembly, or nurser package, for packaging liquid baby food or nourishment suitable for babies and infants and which also permits nipple feeding of the packaged contents directly from the package. Thus, the necessity of household sterilization of nursing nipples, baby bottles, caps and other utensils ordinarily required as an incident of baby feeding is obviated. Furthermore, the package is assembled in such manner that the components may be sterilized under scientifically controlled processing and packaging conditions and assembled into a sanitary, aseptic package. In this latter respect the nursing element need never be handled or otherwise touched prior to insertion thereof into the baby's mouth for feeding purposes.

It will, of course, be understood that various details of construction, combination and assembly may be modified throughout a wide range of equivalents, and it is, therefore, not the purpose to limit the scope of the present invention otherwise than as necessitated by the scope of the appended claims.

I claim:

1. A nursing package comprising, in assembled cooperative relationship, a container having a closed dispensing end provided with at least one perforable area therein, liquid baby nourishment packaged in hermetically sealed relationship within said container, a hollow nursing nipple, said nursing nipple having an annular flanged base defining an orifice and overlying said dispensing end and contacting said container in fluid-tight sealed relationship along a marginal area extending circumambiently and continuously around said perforable area and said orifice, said nursing nipple and said container being arranged in such assembled relationship as to furnish mean accommodating perforation of said perforable area without necessitating disassembly of said nursing nipple from said container, said nursing nipple also having a medial perforate nursing end extending axially outward from said flanged base and communicating interiorly with said orifice, said flanged base also defining together with said dispensing end a fluid-tight passageway leading between said perforable area and said orifice, said passageway being unvented otherwise than by intercommunication through the hollow interior of said nursing nipple with said perforate nursing end, and a detachable lid carried over said nursing nipple and enclosing said perforate nursing end.

2. A nursing package comprising, in assembled cooperative relationship, a hermetically sealed container with fluid baby nourishment therein, a hollow nursing nipple carried on said container, said container having a perforable dispensing end, said nipple having an annular flanged base and a medial perforate nursing end extending axially outward from said flanged base, said flanged base being mounted on and having an underside surface facing said dispensing end, means disposed between and separating a regional portion of said underside surface from said dispensing end in spaced-apart relationship, and said means in cooperation with said underside surface and said dispensing end defining therebetween a fluid-tight fluid passageway emptying into said nursing end and leading to a selected perforable area of said dispensing end disposed in axial alignment with an axially adjacent area of said flanged base at a situs radially outward from the confluence of said flanged base and said nursing end, said passageway being unvented otherwise than by intercommunication through the hollow interior of said nursing nipple with said medial perforate nursing end, and said nursing nipple being constructed to afford means accommodating perforation of said selected perforable area of said dispensing end without dismounting said flanged base from said dispensing end.

3. The combination defined in claim 2, wherein said means constitutes a continuous annular rib extending circumambiently around the orifice defined in said annular flanged base and passing radially outward of said perforable area of said dispensing end.

4. The combination defined in claim 2, wherein said flanged base is provided with a perforate portion at a situs isolated from said enclosed passageway and communicating with an additional perforable area of said dispensing end.

5. A nursing package comprising, in assembled cooperative relationship, a hermetically sealed container with fluid baby nourishment therein, a hollow nursing nipple carried on said container, said container having a perforable dispensing end, said nipple having an annular flanged base and a medial perforate nursing end extending axially outward from said flanged base, said flanged base having an underside surface axially opposite said nursing end, said underside surface having a central portion arranged in spaced overlying relationship with said dispensing end and having an annular portion surrounding said central portion and contacting said dispensing end in air-tight relationship to thereby form an enclosed fluid passageway disposed between said dispensing end and said central portion and emptying radially into said nursing end and with said fluid passageway being air-tight otherwise than by intercommunication with the medial perforate nursing end of said nursing nipple and through the hollow interior of said nursing nipple, said flanged base also defining a transverse aperture disposed in spaced non-communicating relationship with respect to said fluid passageway, said nursing nipple and said container also being arranged in such assembled relationship as to accommodate perforation of said perforable dispensing end at a location leading into said fluid passageway without necessitating disassembling said nursing nipple from said container and without necessitating disruption of the airtight relationship between said dispensing end and the annular underside surface portion of said nursing nipple.

6. For use on a container having an open-ended dispensing end, the combination comprising a perforable closure having an interior surface adapted to hermetically seal said dispensing end and having an oppositely disposed exterior mounting surface, and a nursing element fabricated from a stretchable resilient material and comprising an axially extending hollow body portion terminating in a perforate outer end portion at one axial end and in an annular radially flanged inner end portion at the other axial end mounted in overlying relationship on said exterior mounting surface of said perforable closure, said radially flanged inner end portion defining an orifice communicating with the hollow interior of said body portion and also defining a transverse aperture at a situs radially outward from the central axis of said nursing element, said radially flanged inner end portion also having an underside surface provided with a continuous and substantially circular closed rib formed thereon in circumambient relationship with said orifice, said rib having a major longitudinal portion disposed at a greater radial distance from the central axis of said nursing element than said transverse aperture and having a minor longitudinal portion defining a concave sinus adjacent to said transverse aperture and passing between said orifice and said transverse aperture.

7. A nursing element fabricated from a stretchable resilient material and comprising an axially extending hollow body portion terminating in a perforate outer end portion at one axial end and in an annular radially flanged inner end portion at the other axial end defining an orifice communicating with the hollow interior of said body portion, said flanged inner end portion also defining a transverse aperture at a situs radially outward from the central axis of said nursing element and having an underside surface facing axially away from said body portion, said underside surface having a continuous and substantially circular closed rib formed thereon in circumambient relationship with said orifice, said rib having a major longitudinal portion disposed at a greater radial distance from the central axis of said nursing element than said transverse aperture and having a minor longitudinal portion defining a concave sinus adjacent to said transverse aperture and passing between said orifice and said transverse aperture.

8. A nursing element fabricated from a stretchable resilient material and comprising an axially extending hollow body portion terminating in a perforate outer end portion at one axial end and in an annular radially flanged inner end portion at the other axial end defining an orifice communicating with the hollow interior of said body portion, said flanged inner end portion also defining a transverse aperture at a situs radially outward from the central axis of said nursing element and having an underside surface facing axially away from said body portion, said underside surface having a continuous closed rib formed thereon defining a sinuous path in circumambient relationship with said orifice and passing between said orifice and said transverse aperture, said hollow body portion also defining a plurality of marginally spaced longitudinal grooves about the periphery thereof, and at least one of said grooves being in axial alignment with said transverse aperture to accommodate a puncturing implement and axially align same with said transverse aperture and other preselected locations on said flanged inner end portion disposed between said orifice and said closed rib.

9. A nursing package comprising, in assembled cooperative relationship, a container having a closed dispensing end provided with at least two separate perforable areas therein, liquid baby nourishment packaged in hermetically sealed relationship with said container, a nursing nipple fabricated from a stretchable resilient material and comprising an axially extending hollow body portion terminating in a perforate outer end portion at one axial end and in an annular radially flanged inner end portion at the other axial end defining an orifice communicating with the hollow interior of said body portion, said flanged inner end portion also defining a transverse aperture at a situs radially outward from the central axis of said nursing nipple and having an underside surface facing axially away from said body portion, said underside surface having a continuous closed rib formed thereon contacting said container in fluid-tight sealed relationship along a sinuous path in circumambient relationship with said orifice and passing between said orifice and said transverse aperture, and said flanged base together with said dispensing end defining an unvented fluid-tight passageway leading therebetween and communicating with said orifice, at least one of said separate perforable areas being disposed within the confines of said fluid-tight passageway and another one of said separate perforable areas being disposed exteriorly of the confines of said fluid-tight passageway and in communicating relationship with said transverse aperture, and a detachable lid carried over and enclosing said perforate outer end portion of said nursing nipple.

10. A nursing package in accordance wih claim 9, wherein said rib is substantially circular with a portion thereof at a greater radial distance from the central axis of said nursing nipple than said transverse aperture.

11. A nursing package in accordance with claim 9, wherein a major longitudinal portion of said rib is disposed at a greater radial distance from the central axis of said nursing nipple than said transverse aperture and wherein a minor longitudinal portion of said rib defines a concave sinus adjacent to said transverse aperture.

12. For use on a container having an open-ended dispensing end, the combination comprising a perforable closure having an interior surface adapted to hermetically seal said dispensing end and having an oppositely disposed exterior mounting surface, and a nursing element fabricated from a stretchable resilient material and comprising an axially extending hollow body portion terminating in a perforate outer end portion at one axial end and in an annular radially flanged inner end portion at the other axial end mounted on and having an underside surface facing the mounting surface of said closure and defining an orifice communicating with the hollow interior of said body portion, said flanged inner end portion also defining a transverse aperture at a situs radially outward from the central axis of said nursing element, means disposed between and separating a regional portion of said underside surface from said mounting surface in spaced-apart relationship, said means in cooperation with said underside surface and said mounting surface defining an enclosed fluid-tight passageway separated from communication with said transverse aperture and leading into the hollow interior of said nursing element from a perforable area of said closure disposed at a situs radially outward therefrom, said hollow body portion also defining a longitudinally grooved surface portion in axial alignment with said transverse aperture to align and guide a puncturing implement through said transverse aperture and said perforable closure.

13. The combination defined in claim 12, in further combination with means enveloping at least the perforate outer end portion of said nursing element and confining same within a sterile environment.

14. The combination defined in claim 13, wherein said enveloping means and said perforable closure cooperate to confine said nursing element entirely within a sterile environment.

15. A nursing package comprising, in assembled cooperative relationship, a container having a closed dispensing end provided with at least one perforable area therein, liquid baby nourishment packaged in hermetically sealed relationship within said container, a hollow nursing element fabricated from a stretchable resilient material and comprising an axially extending hollow body portion terminating in a perforate outer end portion at one axial end and in an annular radially flanged inner end portion at the other axial end defining an orifice and overlying said dispensing end and contacting said dispensing end to form a fluid-tight seal extending along a continuous sinuous path disposed in circumambient relationship with said orifice and passing between said orifice and said transverse aperture, said hollow body portion also defining a plurality of marginally spaced longitudinal grooves about the periphery thereof in axial alignment with preselected locations on said flanged inner end portion overlying said perforable dispensing end, at least one of said preselected locations being the situs of said transverse aperture and another of said preselected locations being disposed between said orifice and said fluid-tight seal, and a detachable lid carried over said nursing element and enclosing the perforate outer end portion thereof.

16. The combination defined in claim 15, wherein said detachable lid is shaped to enclose and snugly conform to the exterior configuration of the body portion of said nursing element including the plurality of marginally spaced longitudinal grooves therein, whereby the conforming longitudinal grooves in said detachable lid provide guides for aligning a puncturing implement in properly oriented relationship with said preselected locations on said flanged inner end portion.

References Cited by the Examiner

UNITED STATES PATENTS

| | | | |
|---|---|---|---|
| 2,513,896 | 7/1950 | Searer | 128—252 |
| 2,597,483 | 5/1952 | Head. | |
| 2,628,616 | 2/1953 | Ransom | 128—252 |
| 2,628,908 | 2/1953 | Horan | 99—171 |
| 2,628,909 | 2/1953 | Horan | 99—171 |
| 2,628,910 | 2/1953 | Horan | 99—171 |
| 2,803,251 | 8/1957 | White | 128—252 |
| 2,846,103 | 8/1958 | Maxwell | 215—11 |
| 2,960,088 | 11/1960 | Witz | 128—252 |
| 3,115,980 | 12/1963 | De Woskin. | |
| 3,187,918 | 6/1965 | Moore. | |

A. LOUIS MONACELL, *Primary Examiner.*

THERON E. CONDON, RAYMOND N. JONES,
*Examiners.*

R. H. SCHWARTZ, *Assistant Examiner.*